United States Patent [19]

Nakano et al.

[11] Patent Number: 5,369,766
[45] Date of Patent: Nov. 29, 1994

[54] OBJECT-ORIENTED LOADER SYSTEM WITH SUPPORT FOR DIFFERENT LOAD FORMATS

[75] Inventors: Russell T. Nakano, Sunnyvale; Andrew G. Heninger, Los Altos, both of Calif.

[73] Assignee: Taligent, Inc., Cupertino, Calif.

[21] Appl. No.: 37,054

[22] Filed: Mar. 25, 1993

[51] Int. Cl.⁵ .............................................. G06F 9/40
[52] U.S. Cl. .............................. 395/700; 364/DIG. 1; 364/280
[58] Field of Search ........... 395/700; 364/280, DIG. 1

[56] References Cited

U.S. PATENT DOCUMENTS

| | | | |
|---|---|---|---|
| 4,821,220 | 4/1989 | Duisberg | 364/578 |
| 4,885,717 | 12/1989 | Beck et al. | 364/900 |
| 4,891,630 | 1/1990 | Friedman et al. | 340/706 |
| 4,953,080 | 8/1990 | Dysart et al. | 364/200 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,848 | 12/1991 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,181,162 | 1/1993 | Smith et al. | 364/419 |
| 5,247,678 | 9/1993 | Littleton | 395/700 |
| 5,257,369 | 10/1993 | Skeen et al. | 395/600 |
| 5,261,080 | 11/1993 | Khoji et al. | 395/500 |
| 5,303,375 | 4/1994 | Collins et al. | 395/650 |

OTHER PUBLICATIONS

Letwin, G., "Dynamic Linking in OS/2", Byte, vol. 13, No. 4 pp. 273-280, Apr., 1988.
Syck, G., "Dynamic Link Libraries For DOS", Dr. Dobb's Journal, pp. 30-39 (cont.), May 1990.

*Primary Examiner*—Kevin A. Kriess
*Assistant Examiner*—A. Katbab
*Attorney, Agent, or Firm*—Keith Stephens

[57] ABSTRACT

A method and apparatus for an innovative object oriented framework system is disclosed. The system uses an innovative load architecture for a framework application and provides a system and method for dynamically linking load modules at runtime. The preferred embodiment employs a collection of load modules, each of which contains functions, static data, and classes to make the load modules appear as if they were statically linked together. However, code executing in one load module can perform operations on another load modules code, such as: calling a function, or obtaining a pointer to a function; accessing static data or obtaining a pointer to the static data; calling any public or protected member function of a class to obtain a pointer or access a public or protected data member of the class; or cast to any base of an object of a class.

23 Claims, 9 Drawing Sheets

| TLoadModule acts like a collection of... | that is indexed on... | A client can ask for... |
|---|---|---|
| functions | function name | TFunctionHandle*, or void* (i.e. function address) |
| static data items | static data name | void* (i.e. static data address) |
| classes | class name | TClassHandle* |

FIG. 2

| To change a load module's state from Æ to... | This function will be called exactly once, in the sequence given. | This function may be called zero or more times. |
|---|---|---|
| Closed Æ Opened | a. constructor<br>b. operator <<= | after operator <<=...<br>c. GetPreferredRelocationAddress,<br>GetRequiredLowerSpaceSize,<br>GetRequiredUpperSpaceSize<br>d. CreatedirectRequiredLoadModuleRefIterator |
| | e. Relocate | |

FIG. 6

| | | |
|---|---|---|
| while Opened | | GetFunctionAddress, GetStaticDataAddress, DoesContainAddress, GetName, GetContentID, GetRelocationID, GetRelease, IsCompatibleWithCreateClassHandle, CreateFunctionHandle, CreateClassIterator, CreateFunctionIterator, CreateDirectRequiredLoadModuleRefIterator, CreateMappableDataContainer | Any function that is valid while load module is Opened. |
| Opened Æ Loaded | f. InitializeStaticData g. Link h. CallStaticConstructors i. CallEnterProcs | |

FIG. 7

| while Loaded | | Any function that is valid while load module is Opened, plus... LockMemory, UnlockMemory, CreateAddressRangeIterator, ...in addition, all functions, static data, and classes are valid. |
|---|---|---|
| Loaded Æ Opened | j. CallExitProcs<br>k. CallStaticDestructors<br>l. Unlink<br>m. FinalizeStaticData | Any function that is valid while load module is Opened. |
| Opened Æ Closed | n. destructor | |

FIG. 8

OBJECT-ORIENTED LOADER SYSTEM WITH SUPPORT FOR DIFFERENT LOAD FORMATS

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED PATENT APPLICATIONS

This patent application is related to the patent application Ser. No. 07/996,171 entitled Object Oriented Framework System, by Debra L. Orton, David B. Goldsmith, Christopher P. Moeller, and Andrew G. Heninger, filed Dec. 23, 1992, and assigned to Taligent, the disclosure of which is hereby incorporated by reference.

FIELD OF THE INVENTION

The present invention relates generally to object oriented applications and more particularly to an innovative load architecture for object oriented applications.

BACKGROUND OF THE INVENTION

Among developers of workstation software, it is increasingly important to provide a flexible software environment while maintaining consistency in the user's interface. An early attempt at providing this type of an operating environment is disclosed in U.S. Pat. No. 4,686,522 to Hernandez et al. This patent discusses a combined graphic and text processing system in which a user can invoke a dynamic menu at the location of the cursor and invoke any of a variety of functions from the menu. This type of natural interaction with a user improves the user interface and makes the application much more intuitive.

Object oriented applications should also reflect a consistent interaction interface with the user regardless of what application is currently active, and how many concurrent users are using the application. None of the prior art references applicant is aware of provides the innovative hardware and software system features which enable all object oriented applications to function in a consistent manner.

Various development environments and tools produce load modules with a wide variety of formats and layouts. None of these environments use object oriented techniques to allow load modules to integrate as a single application.

SUMMARY OF THE INVENTION

The subject invention overcomes the deficiencies of the prior art by providing a system and method for dynamically linking load modules at runtime. A preferred embodiment employs a collection of load modules with different physical formats, each of which contains functions, static data, and classes to make the load modules appear as if they were statically linked together. However, code executing in one load module can perform operations on another load modules code, such as calling a function, or obtaining a pointer to a function; accessing static data or obtaining a pointer to the static data; calling any public or protected member function of a class to obtain a pointer or access a public or protected data member of the class; or cast to any base of an object of a class.

BRIEF DESCRIPTION OF THE DRAWINGS

FIG. 2 which illustrates how a TLoadModule acts like collections of functions, static data items, and classes in accordance with a preferred embodiment of the subject invention;

FIGS. 6, 7 and 8 summarize the processing completed in the flowcharts in accordance with a preferred embodiment of the subject invention.

DETAILED DESCRIPTION OF THE INVENTION

Figure 1:
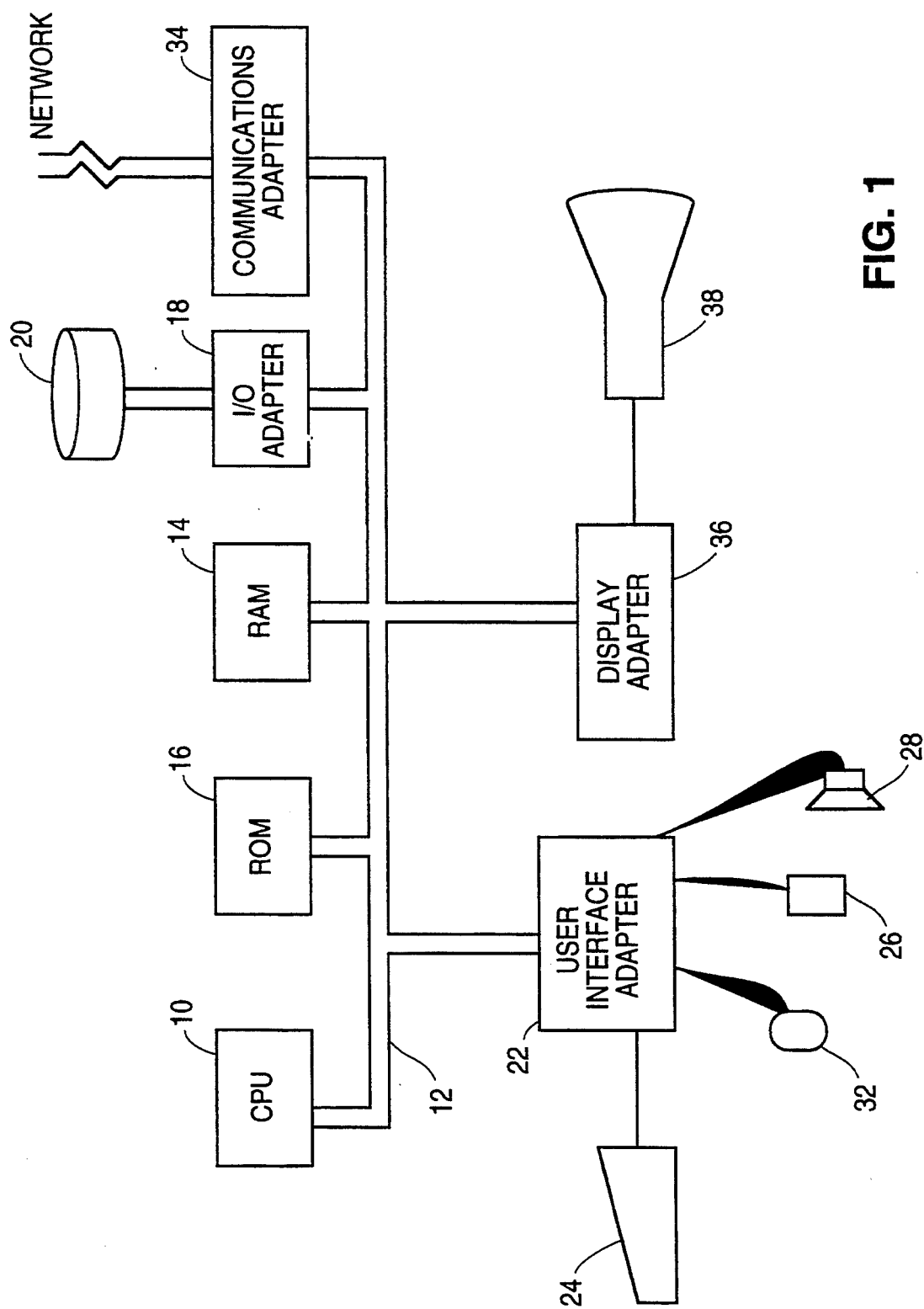
FIG. 1 is a block diagram of a personal computer system in accordance with a preferred embodiment of the subject invention.

A preferred embodiment of the invention is preferably practiced in the context of an operating system resident on a personal computer such as the IBM ® PS/2 ® or Apple ® Macintosh ® computer. A representative hardware environment is depicted in FIG. 1, which illustrates a typical hardware configuration of a workstation in accordance with the subject preferred embodiment having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38. The workstation typically has resident thereon an operating system such as the IBM OS/2 ® operating system or the Apple System/7 ® operating system.

A load module implements functions, static data, and classes. TLoadModule, an abstract class, defines the protocol to load and access load modules. TLoadModule allows subclasses to use very different approaches to represent and implement functions, static data, and classes. For example, a ROM on a NuBus card, a boot partition on a disk, or a disk file, can all appear as load modules. Similarly, different programming languages and development environments can use pre-existing TLoadModule subclasses, or design custom subclasses, to suit special needs. The TLoadModule class provides a common protocol for the loader to mix and match fundamentally different kinds of containers of data built by diverse development environments.

Consider the classes, TIncrementalLoadModule and TPublishedLoadModule. These subclasses embody completely different implementations of TLoadModule, and have different purposes. TIncrementalLoadModule optimizes for fast incremental linking during code development while allowing an application to remain in execution while the load module remains tethered to a development environment, possibly at the expense of larger size. In contrast, TPublishedLoadModule optimizes for speed of execution and for minimal file size.

The loader uses load modules. It acts as a go-between; it takes a collection of load modules, each of which contain functions, static data, and classes, and makes the load modules appear to be statically linked with each other. Code executing in one load module can perform the following operations on exports from another load module indistinguishably from similar operations on its own functions, static data, and classes:

Call a function, or obtain a pointer to it.
Access exported static data, or obtain a pointer to it.
Call any public or protected member function (virtually or non-virtually) of a class, get a pointer thereto, or access any public or protected data member, of the class.
Given an object of a class, cast to any base (virtual or non-virtual).

A TLoadModule acts like three collections, consisting of functions, static data items, and classes. Clients such as the loader will index into the collections by name, as shown in FIG. 2 which illustrates how a TLoadModule acts like collections of functions, static data items, and classes. In addition, a load module lets a client examine all of its functions and class exports through iterators.

For purposes of the preferred embodiment, the "loader" refers to a handful of methods that operate on the global state of an application. These methods ensure that a given load module is loaded only once per application, regardless of the number of tasks that explicitly or implicitly load it. For instance, suppose two tasks resurrect the same flattened object simultaneously. By resurrecting an object, the preferred embodiment loads the flattened object into memory and prepares the proper linkages in accordance with the loader discussion to follow.

Although the code which implements the resurrect operation in each task may invoke the loader, only the first invocation invokes operations on a TLoadModule. The thread of control in the second task will see that the desired load module has already been loaded and it will merely bump a reference count. The loader makes it appear as if a collection of load modules are statically linked with each other through the following steps. First, when a developer builds a given load module with zero or more other load modules that resolve external dependencies, this becomes the direct required set of a load module. The load module stores the particular functions, static data items, and classes that it uses from this set. At load time, the loader queries the load module for the load modules in its direct required set by name; the loader computes such a set within the constraints imposed by compatibility.

If the loader needs to load module A, then the loader computes the transitive closure of the direct required set for A. The loader runs each load module in this closure through its initialization. For instance, the loader calls the method to resolve external linkages on all the load modules, followed by the method to call static constructors on all the load modules. A similar sequence, in the reverse order, occurs when an application shuts down.

Throughout this description of the preferred embodiment, load modules that are shared libraries, and applications in the traditional sense are exchangeable. An "application" typically has a well-known entry point, such as "main" that defines the main program. The concept of an "entry point" has been abstracted into the TTaskProgram class. TLoadModuleRef is a helper class. It is the interface by which a TLoadModule tells the loader which other load modules it depends on. The TLibrarySearcher class provides a framework to map a library name to a specific data container that will be used to construct a load module.

Figure 3:
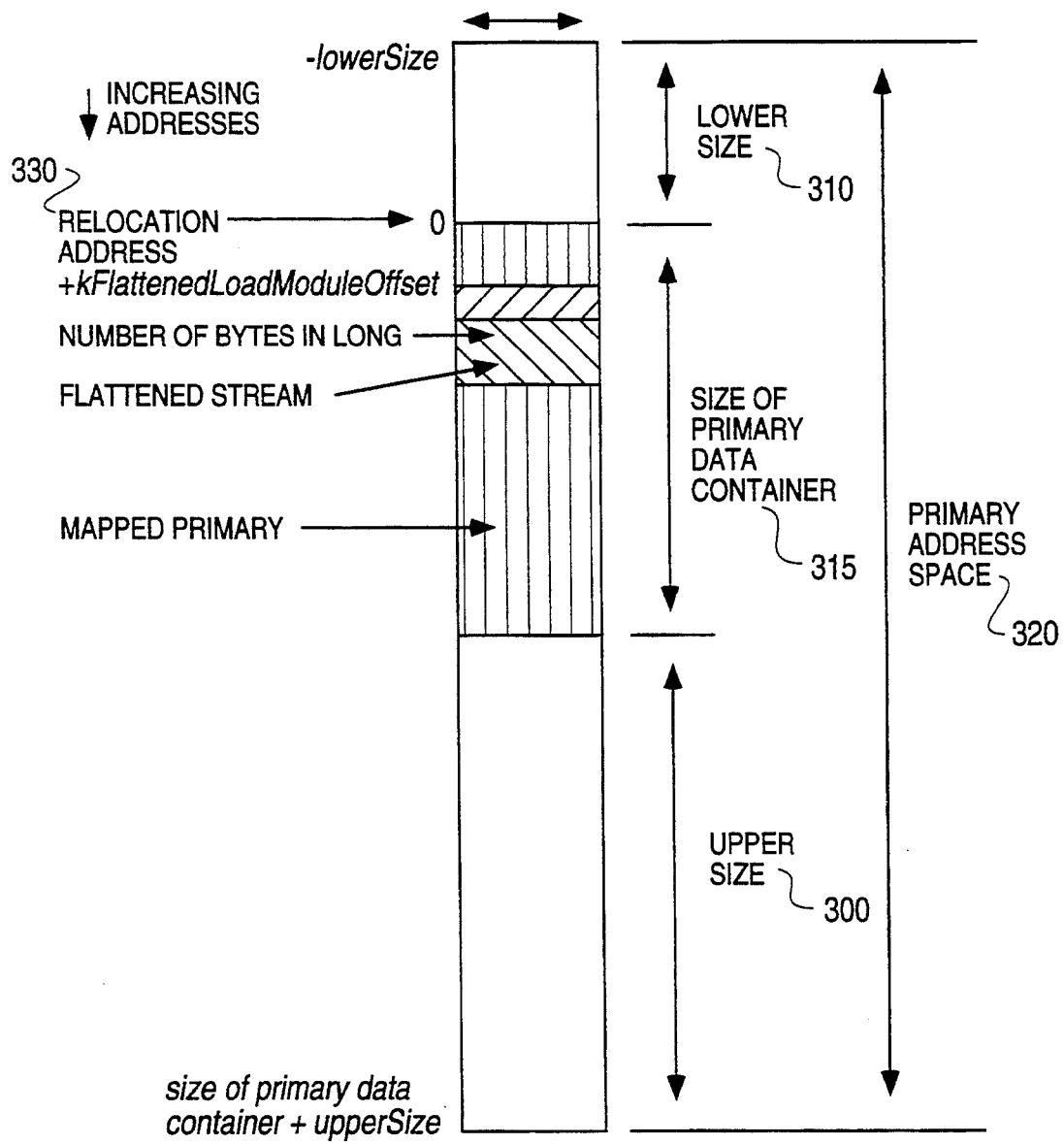
FIG. 3 is a memory map of a TLoadModule of the application as it appears in the memory of the computer in accordance with a preferred embodiment of the subject invention.

FIG. 3 is a memory map of a TLoadModule of the application as it appears in the memory of the computer. The application can respond to queries about the address of a specific function or static data export. Clients may browse the classes, functions, and static data that is exported.

Figure 4:
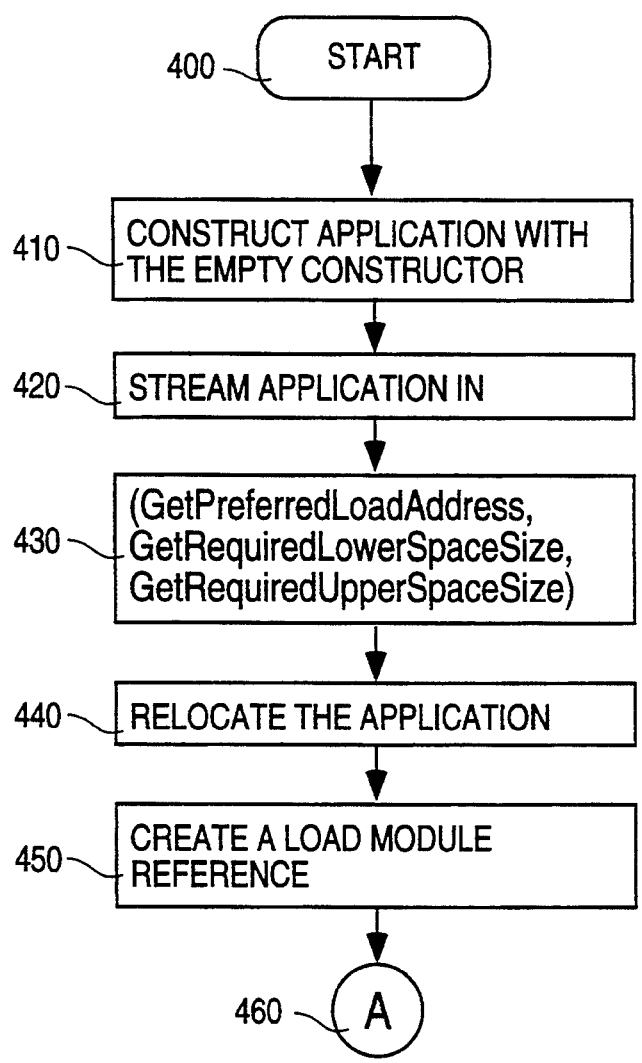
FIGS. 4 and 5 are flowcharts illustrating the logical processing of a load module that opens, loads, unloads, and closes in accordance with a preferred embodiment of the subject invention.

The basic sequence of events in terms of a load module that opens, loads, unloads, and closes are described below and shown in the flowchart spanning FIGS. 4 and 5. Later, an elaboration is provided indicating how a TLoadModule subclass developer may handle caching optimization. A closed load module is created from a primary data container returned from a TLibrarySearcher. A data container refers to a file, ROM, memory or other storage facility for an application program. The loader maps the primary data container into an address space, in read-only mode. By convention, a primary data container contains a sized stream containing a flattened representation of a TLoadModule, at some pre-defined location (kFlattenedLoadModuleOffset) relative to the beginning of the data container.

Closed→Opened a. The first step is to construct an application with the empty constructor as shown in function block 410 of FIG. 4.

b. (operator<<=) Then, the applications is streamed in as shown in function block 420. The stream contains size requirements, flattened TFile's for metadata, TFile's for code, or other objects that indicate which data container to use. The stream contains enough information to answer GetName and GetContentID calls, or it points to a data structure containing this information.

c. If this application is the first to open a given data container, the application must provide the following information as shown in function block 430. Otherwise, the loader uses answers provided by an earlier application. Therefore, the answers depend solely on the contents of the data container, or any caches associated with it.

As illustrated in the load map of FIG. 3, the application must first indicate its fixed space requirements, and its preference of a particular relocation address (e.g., because of previously computed and cached data structures). The application also requests a block of address space above and below its primary data container, referred to as the upper 300 and lower size 310, respectively. The primary data container 315, plus the upper and lower sizes are referred to as the primary address space 320 for this load module. The application can specify either or both of the upper and lower sizes as zero. If both are zero, this implies that the application requires no additional address space beyond the minimal space required to map the primary data container.

d. (Relocate)

The application must assign a relocation address 330, and the virtual address space it has been assigned as shown in function block 440. Notice that the application can choose how to use its assigned address space. In particular, it is free to open one or more segments within the primary address space 320, and there may be gaps between them if selected. The loader may or may not assign the address requested in step c. Next, the application can proceed to step e. to be loaded, or step n. where the application is closed.

e. Opened→Loaded (CreateDirectRequiredLoadModuleRefIterator) indicates which other load modules are required to be loaded because the application depends on them for classes, functions, or static data. A TLoadModuleRef is created with the name of each load module that is required for linkage as shown in function block 450 of FIG. 4, and passed to the loader through the iterator. The loader computes the transitive closure of the load modules, opens them, and provide access to make TLoadModule method calls on them beginning in step g., and extending through step I.

f. (Initialize Static Data)

Figure 5:
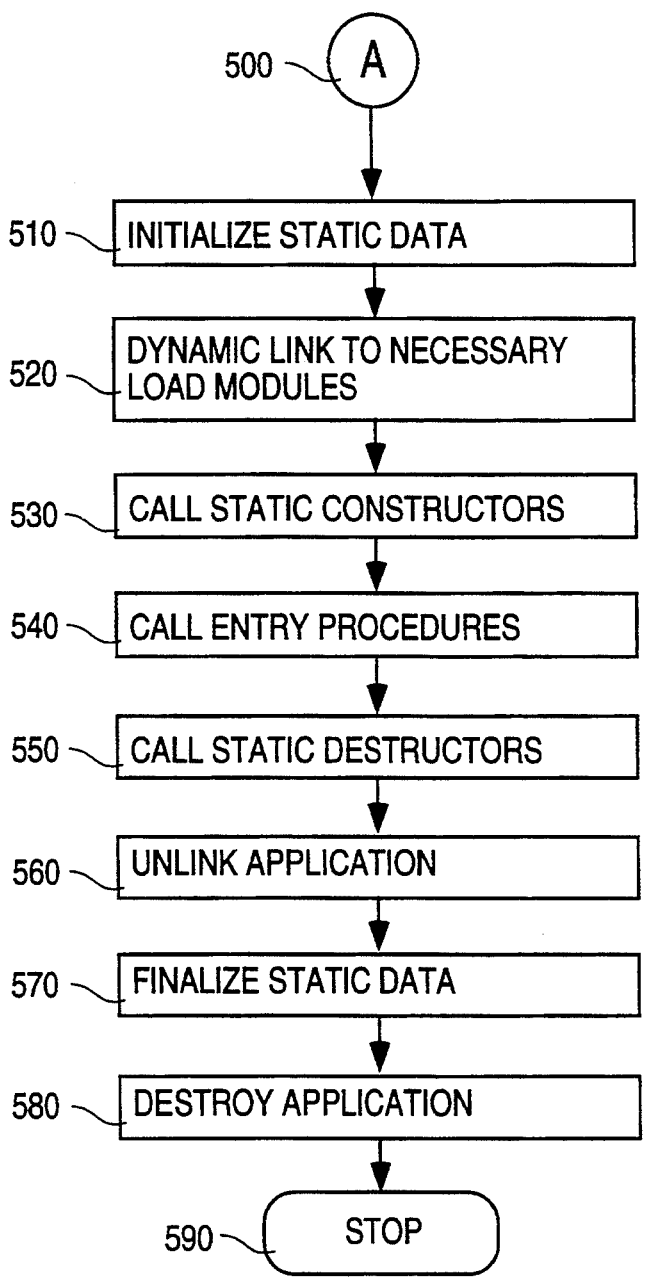

Initialize the application's static data as shown in function block 510 of FIG. 5.

g. (Link)

Link the application to any load module that you indicated in step f as shown in function block 520 of FIG. 5. For example, if the application contains external jumps to a function in another load module, query that load module for the address of that function, and patch the application accordingly. Similarly, if code exists which references a global data item exported by another load module, query that load module for its address. Finally, if the application contains a class that inherits directly or indirectly from a class exported by another load module, query that load module for the TClassHandle corresponding to its class. In addition, perform any computations that depend on direct or indirect required load modules.

h. (Call Static Constructors)

Call the application's static constructors as shown in function block 530.

i. (CallEnterProcs)

Call any procedures that rely on static constructors having been executed, but occur before user code as shown in function block 540. The application is loaded at this point in the processing. A client may use any class, function, or static data the application exports. The application is ready to handle queries about your exports, either when directly queried for one of them by name, or you provide an iterator whereby clients can examine each export.

Loaded→Opened j. (CallExitProcs)

The application then calls any procedures that need to run after user code has completed, but before static destructors run.

k. (CallStaticDestructors)

The application then calls static destructors that are specific to the applications as shown in function block 550.

l. (Unlink)

Then, the application unlinks as shown in function block 560. In practice, this means to get ready to load again, although the application may not be loaded again. The application retains the same relocation address, but the other load modules on which it depend changes. For example, if the application depends on library A, and the loader queries the application to "unlink," keep enough internal state to remain open, but destroy any state that relies on anything that A has told the application. This includes addresses of functions and static data. Implementations that do caching need to be mindful of this point. In addition, the application performs any operations before the loader disconnects the direct and indirect load modules.

m. (FinalizeStaticData)

Then, the application finalizes its static data as shown in function block 570. The application is now able to handle any method that is valid for an open load module. Processing for the application continues at either, step e as shown at function block 450 of FIG. 4, where the application gets loaded again, or step n shown in function block 580 of FIG. 5, where the application is closed.

Opened Æ Closed n. Destroy yourself.

The application is closed at function block 580 and processing is completed at terminal 590. The steps shown in the flowchart are summarized in the table appearing in FIGS. 6, 7 and 8.

In this section, examples of the design latitude available to TLoadModule subclass designers are given. A load module tells the loader how much primary address space it requires, and the loader passes the request to the libserver. The loader returns a contiguous block, the size of the block is no smaller than the sum of GetRequiredLowerSpaceSize, GetRequiredUpperSpaceSize, and the size of the primary data container. Although a load module may request a particular relocation address (e.g., to reuse previously computed and cached data structures), the loader can assign a different address. The relocation address assignment occurs through the Relocate method.

If two applications on the same machine load modules backed by the same data container, the loader guarantees to assign the load modules the same relocation address. Moreover, an implementation of a load module is required to use its assigned address range consistently across different instances. (For example, if applications load the load module A, and the libserver assigns A to relocation address x, then the preferred embodiment's conventions require all instances of TLoadModule to locate any given static data item in A at the same address, x+s, across applications.) It is valid for a load module to request zero for both the upper and lower sizes. If this convention is followed, then the load module will be assigned enough address space to map the primary data container. Simple implementations of TLoadModule may choose to do this.

Having the upper and lower areas gives the load module designer the flexibility of having address ranges that may be allocated in both the positive and negative directions, relative to the relocation address. For example, one approach is to assign the static data area to the lower area, while code is mapped as part of the primary data container. This gives the creator of the load module (e.g. a linker) the ability to place code at positive offsets from the relocation address, while assigning static data addresses at negative offsets. Each can grow independently at build-time, without concern of collision with the other.

Zero, one, or many segments

Within its assigned address space, a load module is free to create or map segments in any way it chooses, assuming that it does so consistently, as described above. For example, an implementation may use separate segments for code, static data, linkage area, etc. Another implementation may choose to map more segments, or none at all. A specific example involves static data. One load module implementation may choose to map a preexisting, fully initialized segment or file. A second implementation may choose to map a segment for the non-zero portion of the static data area, and to create another segment to cover the zero portion of the static data area. A third implementation may choose to create an non-initialized segment, and call a Datainit-style program to fill in the contents.

Absolute addresses

Some languages (e.g. FORTRAN) might require a way to load a main load module at an absolute address. If a language requires this capability, or a linker assumes this, the requisite TLoadModule subclass patches addresses at load time, since the preferred embodiment of the preferred embodiment cannot guarantee the assignment of a particular relocation address.

Optimization by caching

Load module implementations have ample opportunity to improve performance by saving the results of computations on one load that may be reused on a subsequent load. To help determine the validity of cached information from a previous load, load modules answer the following questions:

a. GetContentID returns an id corresponding to the contents of the load module; if two load modules have the same content id, then they are guaranteed to be bitwise equal in the read-only code and initialized static data. This guarantee need not apply to static data that will be later filled in with addresses imported from other load modules during the Link step.

b. GetRelocationID returns an id corresponding to the addresses that the load module may subsequently return to clients, consisting of all function addresses and static data addresses. Typically these addresses depend on the loadAddress passed in on the Relocate method. If a relocation id was returned previously, and the addresses are identical, then the same relocation id may returned again. Conversely, if the same id is returned, then other load modules may assume that addresses are identical to the ones returned previously. This implies that a load module never returns addresses for which it cannot maintain this guarantee, including addresses that it obtains during the Link step. After all, the whole point of the relocation id is to optimize away the much of the work involved in a full Link step!

Consider the following:
The content id.
If the content id of a load module has changed, it probably doesn't make sense to reuse a cache built for a different release of itself.
The relocation address.
If the relocation address of a load module has not changed, then you may reuse computed values of addresses exported by the load module. Similarly, you may reuse initialized static data that depends on the relocation address. You may reuse any vtables for classes that inherit only from classes provided internally, which also contain member function pointers that refer only to code within the library.
The content ids of required or used load modules
If all required load modules, in the sense of transitive closure, have the same content ids as were seen on the previous load, then you may reuse any fixups or patches that depend on the content, but not the addresses, of the load modules. For instance, one approach to implementing virtual function calling uses small pieces of code ("thunks") that an index into a virtual function table, where the index is computed and patched into the code at load time. These indices depend on the class hierarchy and the number of member functions, but don't depend on the relocation address of required load modules. If all the load modules for the classes in the hierarchy have the same content id, then the number of member functions haven't changed, and the patched thunk may be reused.
The relocation ids of required or used load modules If furthermore, the relocation addresses of the required load modules are also identical, then you may reuse any linkages based on functions and static data imported from other load modules. This includes vtables, which contain pointers to functions.

Figure 9:
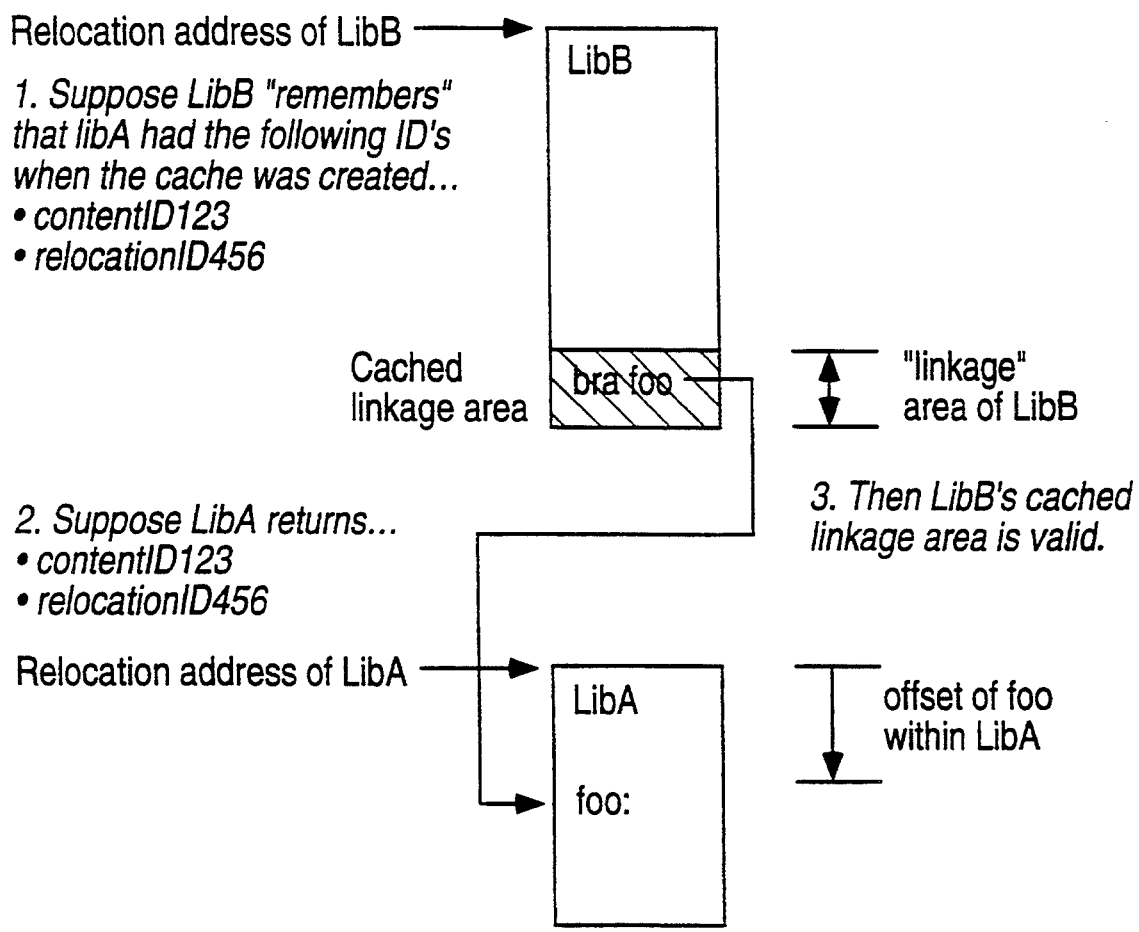
FIG. 9 is a memory map of system storage for relocated addresses of a function exported by LibA in accordance with a preferred embodiment of the subject invention.

In the following typical case, we assume that a load module's cached information is valid if i) the load module itself has the same content and relocation ids as before, and ii) for each load module that it uses ii.a) has the same relocation id, and ii.b) has the same content id. The following algorithm, called during Link, determines if this condition holds:

FIG. 9 is a memory map of system storage for relocated addresses of a function exported by LibA in accordance with a preferred embodiment of the subject preferred embodiment. Note how the relocation ID generalizes the concept of the relocation address. Knowing the relocation address works for items contained within the primary data container, whereas the relocation ID extends to items that may reside in the primary address range, or other address ranges, such as an application-wide static data pool.

Caches

Suppose a subclass of TLoadModule caches a copy of

```
Boolean TMyLoadModule::IsMyCacheValid()
{
        Boolean isValid = TRUE;
//Our cache isn't valid unless we're at the same address and have the same content...
//
        if (GetPreviousRelocationID() == GetRelocationID()
                && GetPreviousContentID() == GetContentID()) {
                TIterator* it = CreatePreviouslyUsedRefIterator();
                for (TMyLoadModuleRef* r =(TMyLoadModuleRef*)it->First();r;r=
(TMyLoadModuleRef*)it->Nex()) {
                        TLoadModule* lm = r->GetLoadModule();
//If yes, check that all the load modules from which we used exports
//when we built the cache are also loaded this time...
//
                        if(lm) {
//If yes, check that the closure of our required load modules
//have the same ids, and have the same relocation address...
//
                                if((r->GetPreviousRelocationID() != lm->GetRelocationID())
                                 || (r->GetPreviousContentID() != lm->GetContentID())) {
//Note the OR ( || ), not comment (//).
//OOPS, one of the load modules that we used on a previous load
//has changed either in content or in relocation. Our cache
//is invalid.
//
                                        isValid = FALSE;
                                        break;
                                }
                        } else {
//OOPS, there's a load module that we used in the previous load,
//that isn't here now... Our cache is worthless.
                                isValid = FALSE;
                                break;
                        }
                        delete it;
                        return isValid;
                } else {
                        return FALSE;
                }
}
```

Other kinds of caches may check their validity using the id primitives described here. For instance, a cache that depends only the relocation addresses of the direct required load modules can check for precisely that condition. To illustrate these concepts, consider a load module LibA which exports the function foo. Load module LibB calls foo. On a previous load, LibB had saved the address of the function foo. Because foo resides in the primary data container of LibA, this address is a function of:
  a) the offset of foo within A, and
  b) the relocation address of LibA.
To determine whether the address of foo may be reused on a subsequent load, it is sufficient for LibB to "remember" the content and relocation ID's returned by LibA.

its linkage area as a file, where another application loading the same load module may attempt to reuse that linkage area. Because of this potential sharing, a cached linkage area represents a shared writeable state, and must be designed to be multi-application safe. Different applications may use different library searchers, which implies that a cached linkage area that is valid for one application may not be valid for another. This says that the TLoadModule subclass needs to handle situations where:
  a) several applications attempt to write out their saved linkage areas simultaneously,
  b) one application may attempt to check the validity of a saved linkage area, concurrently with another application invalidating it and attempting to write an updated copy, and c) two or more applications have conflicting notions of what constitutes a valid linkage area (e.g. because they use different releases of a low-level utility load module), which causes the caches to "thrash."

Additional address space

In some circumstances, a load module may discover that it requires more address space than it obtained as its primary address space (e.g., this may occur during the Link phase). A TLoadModule application must be cognizant of the relocation id guarantee. Typically a load module will be queried for its relocation id during the link phase, which means after CreateDirectRequiredLoadModuleRefs, but before CallStaticConstructors. A load module may not provide as an export address any additional address space that it obtains after CreateDirectRequiredLoadModuleRefs, including during Link. Otherwise, the relocation id guarantee cannot be maintained.

Cross-language operability

Within the same CPU architecture, load modules created by different languages and by different development environments mix-and-match. The preferred embodiment of the preferred embodiment requires that addresses corresponding to exported functions and static data items follow a specific CPU's calling convention, which may involve providing addresses that correspond to translating between the preferred embodiment of the subject preferred embodiment's calling conventions, and a different internal set of conventions. For instance, a load module created by a non-native C++ environment (e.g. Lisp) can mix-and-match freely if:

1) a call into the load module to a function address of an exported function points to code consistent with calling conventions,
2) a call out of the load module goes through glue code that converts from the internal conventions to conventions corresponding to the preferred embodiment of the subject preferred embodiment,
3) a read to a static data address for an exported static data item causes the correct value to appear in some specified destination,
4) a write to a static data address for an exported static data item causes the data item to obtain the correct value from some specified source,
5) casting to a more derived class and casting to a base class both work, even if the classes in the hierarchy aren't all defined by the same language,
6) accessing a public data member or a class static data member, if any, works, and
7) a virtual function call to the TClassHandle or TFunctionHandle object for an exported class, function, or static data item, respectively, follows the protocol for the class.

For example, suppose a subclass of TLoadModule is created from an environment other than C++, and any shared library (e.g., RunTime, LowLevelToolbox). Given a sufficiently robust development environment and the respective declarations used to build the original shared library, it is possible to reimplement the shared library in the other development environment. (Of course, some development environments may choose to restrict the ability of their classes to be subclassed by other environments; such an environment is not "sufficiently robust" according to this definition.) This thought experiment highlights the importance of each CPU architecture to define a common object layout, with respect to casting, virtual function calling, non-virtual function calling, and accessing public data members.

Load-time or runtime binding

For efficiency, most load modules resolve the binding of function and static data names at the Link step, during loading. This strategy is optimal when the number of functions and static data items is relatively small when compared to the number of times that they will be used, or when caching will occur.

Different strategies are possible. For instance, a load module may defer querying another load module for the address corresponding to a function or static data item name until runtime. If there are a very large number of functions, and the likelihood of calling any one is small, a better strategy is to resolve the name to address binding at the time of the first call. This situation occurs in the context of a development environment building one or many moderate to large-sized load modules, where the bulk of time is spent in the edit-recompile-relaunch-debug loop.

Concurrency

Subclasses of TLoadModule do not require reentrancy, because although TLoadModule objects are shared by all tasks on an application, and multiple tasks may perform loading concurrently, the loader performs operations under a "loader semaphore."

Packed static data

Some performance measurements indicate that the amount of writeable static data per load module is frequently much smaller than a page, which leads to a large amount of fragmentation when each load module places its static data independently. Since the amount of writeable static data on a given machine is the product of the number of load modules per application, times the number of applications, fragmentation significantly boosts the demand for physical memory, and hurts performance. One solution to this problem packs static data from all the load modules on an application into a per-application memory segment.

Since static data addresses are passed out as exports, an implementer of a packed static data scheme must obey the relocation id guarantee. One technique is to register for a given block of shared system space memory during the InitializeStaticData step; if the same address is obtained as before, and the Relocate step passes in the same load address as before, then it is valid for GetRelocationID to return the same id as before.

8. Class descriptions

The following C++ code illustrates the logic in accordance with the preferred embodiment of the class descriptions,

```
class TLoadModule  : public MReferenceCounted, public MCollectible {
public:
        //=====================================
        //Use at build time
        //Stream out information used by the TLoadModule base class.
        //
        virtual   TStream&     operator>>=(TStream& towhere) const;
        //=====================================
        //Closed Æ Open
        //
                          TLoadModule();
        virtual   TStream&     operator<<=(TStream& fromwhere);
        virtual   void*        GetPreferredRelocationAddress();
        virtual   size_t       GetRequiredLowerSpaceSize();
        virtual   size_t       GetRequiredUpperSpaceSize();
        virtual   void         Relocate(const void* relocationAddress,
                                 const TSurrogateMemory& primaryAddressSpace);
        //= =====================================
        //Open Æ Closed
        //
        virtual              ~TLoadModule();
        //=====================================
        //Open Æ Loaded
        //
        virtual   void         InitializeStaticData();
        virtual   TIterator*   CreateDirectRequiredLoadModuleRefIterator();
        virtual   void         Link();
        virtual   void         CallStaticConstructors();
        virtual   void         CallEnterProcs();
        //=====================================
        //Loaded Æ Open
        //
        virtual   void         CallExitProcs();
        virtual   void         CallStaticDestructors();
        virtual   void         Unlink();
        virtual   void         FinalizeStaticData();
        //=====================================
        //OK to call while Opened or Loaded...
        //
        virtual   TMappableDataContainer* CreateMappableDataContainer() const;
        virtual   void   GetName(TText& name) const =0;
        virtual   TGlobalID    GetContentID() const;
        virtual   TGlobalID    GetRelocationID() const;
        //
        //Lookup addresses by name...
        //
        virtual   void*        GetFunctionAddress(const TText& fnSignature) const;
        virtual   void*        GetStaticDataAddress(const TText& dataSignature) const;
        //
        //Indicate the address ranges we use...
        //
        virtual   TRecyclingIterator*   CreateAddressRangeIterator();
        virtual   Boolean      DoesContainAddress(void * addr) const;
        //
        //Get release information...
        //
        virtual   CompatibilityNumber    GetRelease() const;
        virtual   Boolean      IsCompatibleWith(
                          const CompatibilityNumber reqRelease) const;
        //
        //The client owns the storage that is returned. These items are placed on the default
heap.
        //
        virtual   TClassHandle*    CreateClassHandle(const TText& exportName);
        virtual   TFunctionHandle*    CreateFunctionHandle(const TText&
exportName);
        //
        //The load module owns the storage that is returned by the iterators. Successive
objects
        //returned by TRecyclingIterator may be the same object, with different data filled
in. Therefore,
        //a client wishing to keep an object beyond the next iteration, should make a copy.
The
        //client is responsible for deleting the storage for the iterator.
        //
        virtual   TRecyclingIterator*   CreateClassIterator();       //both structs &
classes
        virtual   TRecyclingIterator*   CreateFunctionIterator();    //functions
        //=====================================
        //Call while Loaded only...
        //
        //Tell Opus not to page the memory associated with this load module
```

-continued

```
         virtual  void     LockMemory();
         virtual  void     UnlockMemory();
         //=====================================
         //MCollectible stuff...
         //
         virtual  Boolean  IsEqual(const MCollectible* other) const;
         virtual  long     Hash() const;
private:
                           TLoadModule(const TLoadModule& that);
                  TLoadModule& operator=(const TLoadModule& other);
};
class TLoadModuleRef : public MCollectible {
 public:
                           TLoadModuleRef ();
                           TLoadModuleRef (TText& name);
                           TLoadModuleRef (const TLoadModuleRef& other);
                  TLoadModuleRef& operator=(const TLoadModuleRef& other);
                           ~TLoadModuleRef():
         //=============================================
         //
         //Identify required load module...
         //
         virtual  void     GetName(TText& name) const;
         virtual  CompatibilityNumber  GetRequiredRelease() const;
         virtual  TLoadModule*  GetLoadModule() const;
         //=============================================
         //
         //The loader hooks this up to the real load module...
         //
         virtual  void     SetLoadModule(TLoadModule* actualLoadModule);
         //=============================================
         //
         //MCollectible stuff..
         //
         virtual  TStream&  operator>>=(TStream& towhere) const;
         virtual  TStream&  operator<<=(TStream& fromwhere);
         virtual  Boolean   IsEqual(const MCollectible* other) const;
         virtual  long  Hash() const;
                           };
```

Method descriptions for TLoadModule Build-time

| TStream& operator>>=(TStream& towhere) const; |
|---|

Stream out the TLoadModule base class. Subclasses need to call this before streaming out their own stuff.

Closed Æ Open

| TLoadModule(); |
|---|

The empty constructor initializes the object state suitable for streaming.

| TStream& operator<<=(TStream& fromwhere); |
|---|

Stream in the TLoadModule base class. Subclasses need to call this before streaming in their own stuff.

| const void * GetPreferredRelocationAddress(); |
|---|
| const size_t GetRequiredLowerSpaceSize(); |
| const size_t GetRequiredUpperSpaceSize(); |

The load module indicates any additional primary address space need. The preferred address provides the loader a hint for an address that is advantageous in reusing caches. The loader will attempt to match the preferred address.

| void Relocate(const void* relocationAddress, const TSurrogateMemory& primaryAddressSpace); |
|---|

The loader indicates the origin and location of the primary address space.

Open→Loaded

The loader interleaves these calls over all load modules being loaded in the current batch. That is, all load modules are given an opportunity to initialize their static data, followed by all being queried for their direct required load module names, followed by all being queried to link, and so forth.

| void InitializeStaticData(); |
|---|
| Initialize static data. |
| TIterator* CreateDirectRequiredLoadModuleRefIterator(); |

Indicate which other load modules are needed to link against. The iterator returns TLoadModuleRef objects, which tells the loader the name of the required load module.

| void Link(); |
|---|

Use the TLoadModuleRef::GetLoadModule method to obtain the TLoadModule* pointer to the actual load modules corresponding to the names provided in the previous step. Make calls such as TLoadModule::GetFunctionAddress or TLoadModule::GetStaticDataAddress to obtain export addresses.

```
void CallStaticConstructors();
Call static constructors.
void CallEnterProcs ();
```

Call enter procedures, if any exist. Currently, some semaphore or other initialization happens here, however these operations will eventually go away.

Loaded→Open

```
void CallExitProcs();
```

Call exit procedures, if any. Deallocate any resources that may have been acquired during the enter procedures.

```
void CallStaticDestructors();
Call static destructors.
void Unlink();
```

This is the last chance to use any other load modules, or to clean up prior to other load modules being blown away.

```
void FinalizeStaticData();
```

Finalize static data. This may entail closing segments. (It makes sense to close segments used for static data here, rather than in the destructor, because browsing is possible in the open state, and it is convenient to browse a load module without the overhead of open segments.)

Get information

```
TMappableDataContainer* CreateMappableDataContainer() const;
```

Return an object, to be deleted by the caller, that describes the underlying data container that from which this load module was built.

```
void GetName(TText& name) const=0;
```

Return the name of this load module. For load modules based on Pluto data containers, this name corresponds to the LibraryName property.

```
TGlobalID GetContentID() const;
```

Return an id corresponding to the contents of the load module; if two load modules have the same content id, then they are guaranteed to be bitwise equal in the read-only code and initialized static data. This guarantee need not apply to static data that will be later filled in with addresses imported from other load modules during the Link step.

```
TGlobalID GetRelocationID() const;
```

Return an id corresponding to the addresses that the load module may subsequently return to clients, consisting of all function addresses and static data addresses. Typically these addresses depend on the loadAddress passed in on the Relocate method. If a relocation id was returned previously, and the addresses are identical, then the same relocation id may returned again.

```
void* GetFunctionAddress(const TText& export) const;
```

Return the address of the function specified by the name export.

```
void* GetStaticDataAddress(const TText& export) const;
```

Return the starting address of the static data item specified by the name export.

```
TRecyclingIterator* CreateAddressRangeIterator();
```

Return an iterator that gives back TSurrogateMemory objects corresponding to the address ranges that this load module uses, that may contain pointers to heap allocated storage. (This could be used as a source of roots for GarbageFinder.)

```
Boolean DoesContainAddress(void * addr) const;
```

Return TRUE if the specified address lies in the primary address range, or the load module is willing to claim some responsibility for the given address. For instance, if a thunk is allocated outside the primary address range, and the debugger sets a breakpoint in that thunk, then a debugger may try to determine which load module knows about that thunk, to determine the thunk's name, for instance. CompatibilityNumber GetRelease() const; Return the compatibility number. Other load modules use this number of determine whether they can run compatibly with this load module. Boolean IsCompatibleWith(const CompatibilityNumber requiredRelease) const; Return TRUE if this load module is compatible with the given release or an earlier release.

```
TClassHandle* CreateClassHandle(const TText& exportName);
```

Return a TClassHandle.

```
TFunctionHandle* CreateFunctionHandle(const TText& functionSignatureName);
```

Return a TFunctionHandle.

```
TRecyclingIterator* CreateClassIterator();
TRecyclingIterator* CreateFunctionIterator();
```

Return an iterator for class and function handles. The TRecyclingIterator is different from a TIterator because it reserves the right to recycle the storage used during one iteration to the next. For example, the TClassHandle returned by First and successive Next might be the same storage, but with different data written in it. Therefore, clients who wish to keep a copy should clone it.

MCollectible stuff

```
long Hash() const;
Boolean IsEqual(const MCollectible* other) const;
```

Equality is based on pointer equality, since it is an error for the loader to open or load two load modules on the same application, based on the same data container.

Method descriptions for TLoadModuleRef
Constructors, destructors, assignment operator

```
TLoadModuleRef ();
```

Use for resurrecting only.

```
TLoadModuleRef (TText& name);
```

A load module giving one of these to the loader says that it needs to dynamically link against the load module with the specified name.

```
TLoadModuleRef (const TLoadModuleRef& other);
```

Copy constructor.

```
TLoadModuleRef& operator=(const TLoadModuleRef& other);
Assignment operator.
                    ~TLoadModuleRef():
```

Destructor.
Identify required load module

```
void GetName(TText& name) const=0;
```

The loader uses this method to find out the name of the load module that is required.

```
TLoadModule* GetLoadModule() const;
```

After giving the TLoadModuleRef to the loader, and the loader computes the transitive closure of the required load modules, use this call to obtain the actual load module.

```
CompatibilityNumber GetRequiredRelease() const;
```

Return the minimal compatibility number required to execute correctly with the load module that gave out this TLoadModuleRef.

While the invention has been described in terms of a preferred embodiment in a specific system environment, those skilled in the art recognize that the invention can be practiced, with modification, in other and different hardware and software environments within the spirit and scope of the appended claims.

What is claimed is:

1. An apparatus for processing a plurality of load modules in a computer, said plurality of load modules created by a plurality of development environments resulting in different load module formats, comprising:
   (a) the computer;
   (b) a storage in the computer;
   (c) processing means in the computer for loading a first object-oriented load module of a first format in said address space;
   (d) processing means in the computer for loading a second load module which can be non-object-oriented of a second format in said address space; and
   (e) processing means in the computer for having said first object-oriented load module and said second load module execute in said address space and utilize portions of said second load module for execution of said first object-oriented load module.

2. An apparatus for processing a plurality of load modules in an address space as recited in claim 1, wherein the processing means in element (e) include means for said first object-oriented load module to call a function in said second load module.

3. An apparatus for processing a plurality of load modules in an address space as recited in claim 1, wherein the processing means in element (e) include means for said first object-oriented load module to obtain a pointer to a function in said second load module.

4. An apparatus for processing a plurality of load modules in an address space as recited in claim 1, wherein the processing means in element (e) include means for said first object-oriented load module to access exported static data in said second load module.

5. An apparatus for processing a plurality of load modules in an address space as recited in claim 1, wherein the processing means in element (e) include means for said first object-oriented load module to obtain a pointer to exported static data in said second load module.

6. An apparatus for processing a plurality of load modules in an address space as recited in claim 1, wherein the processing means in element (e) include means for said first object-oriented load module to call any function of a class in said second load module.

7. An apparatus for processing a plurality, of load modules in an address space as recited in claim 6, wherein the call is virtual.

8. An apparatus for processing a plurality of load modules in an address space as recited in claim 1, wherein the processing means in element (e) include means for Said first object-oriented load module to cast to any base in a second load module.

9. An apparatus for processing a plurality of load modules in an address space as recited in claim 8, wherein the base is virtual.

10. An apparatus for processing a plurality of load modules in an address space as recited in claim 1, wherein the processing means in element (e) include means for said first object-oriented load module to enable a load address in said second load module.

11. An apparatus for processing a plurality of load modules in an address space as recited in claim 1, wherein the processing means in element (e) include means for said first object-oriented load module to link to an address space in said second load module.

12. An apparatus for processing a plurality of load modules in an address space as recited in claim 11, wherein the processing means in element (e) include means for specifying address space requirements above said first object-oriented load module below said first object-oriented load module.

13. An apparatus for processing a plurality Of load modules in an address space as recited in claim 1, including a cache for storing static data.

14. An apparatus for processing a plurality of load modules in an address space as recited in claim 1, including a loader semaphore for coordinating load module loading.

15. A method for processing a plurality of load modules in a computer with an address space, said plurality of load modules created by a plurality of development environments resulting in different load module formats, comprising the steps of:

(a) storing a first object-oriented load module of a first format in said address space;

(b) storing a second load module which can be non-object-oriented of a second format in said address space; and (c) performing operations resident in said second load module in said first load module.

16. A method for processing a plurality of load modules in a computer with an address space as recited in claim 15, wherein step (c) includes the step of calling a function resident in said second load module from said first object-oriented load module.

17. A method for processing a plurality of load modules in a computer with an address space as recited in claim 15, wherein step (c) includes the step of obtaining a pointer to a function resident in said second load module from said first object-oriented load module.

18. A method for processing a plurality of load modules in a computer with an address space as recited in claim 15, wherein step (c) includes the step of accessing exported static data resident in said second load modified from said first object-oriented load module.

19. A method for processing a plurality of load modules in a computer with an address space as recited in claim 15, wherein step (c) includes the step of obtaining a pointer to exported static data resident in said second load module from said first object-oriented load module.

20. A method for processing a plurality, of load modules in a computer with an address space as recited in claim 15, wherein step (c) includes the step of allowing calling any function of a class resident in said second load module from said first object-oriented load module.

21. A method for processing a plurality of load modules in a computer with an address space as recited in claim 20, wherein the call is virtual.

22. A method for processing a plurality. Of load modules in a computer with an address space as recited in claim 15, wherein step (c) includes the step of casting to any base resident in said second load module from said first object-oriented load module.

23. A method for processing a plurality, of load modules in a computer with an address space as recited in claim 22, wherein the cast to any base is virtual.

* * * * *